United States Patent
Chou et al.

(10) Patent No.: US 10,491,037 B2
(45) Date of Patent: Nov. 26, 2019

(54) UNINTERRUPTABLE POWER SUPPLY SYSTEM

(71) Applicant: CYBER POWER SYSTEMS, INC., Taipei (TW)

(72) Inventors: Jui-Hung Chou, Taipei (TW); Chun-Nan Wu, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 84 days.

(21) Appl. No.: 15/796,098

(22) Filed: Oct. 27, 2017

(65) Prior Publication Data

US 2019/0074713 A1 Mar. 7, 2019

(30) Foreign Application Priority Data

Sep. 1, 2017 (CN) .......................... 2017 1 0777415

(51) Int. Cl.
*H02J 7/00* (2006.01)
*H02J 9/06* (2006.01)

(52) U.S. Cl.
CPC ............ *H02J 9/061* (2013.01); *H02J 7/0031* (2013.01)

(58) Field of Classification Search
CPC ..................................................... H02J 7/0031
USPC ....................................................... 320/134
See application file for complete search history.

(56) References Cited

U.S. PATENT DOCUMENTS

| 5,635,773 | A  | * | 6/1997 | Stuart ..................... | H02J 9/062 307/66 |
| 8,786,131 | B2 | * | 7/2014 | Chen ....................... | H02J 9/005 307/11 |
| 9,047,076 | B1 | * | 6/2015 | Lee ......................... | G06F 1/263 |
| 2008/0164761 | A1 | * | 7/2008 | O'Bryant ................ | H02J 9/061 307/66 |
| 2012/0032516 | A1 | * | 2/2012 | Lee ......................... | H02J 9/062 307/66 |
| 2016/0049822 | A1 | * | 2/2016 | Lee ......................... | H02J 7/0068 307/66 |

FOREIGN PATENT DOCUMENTS

| EP | 2760100 A2 | 7/2014 |
| TW | M373601 U | 2/2010 |

* cited by examiner

*Primary Examiner* — Suresh Memula
(74) *Attorney, Agent, or Firm* — Bacon & Thomas, PLLC

(57) ABSTRACT

An uninterruptable power supply system including a battery, a converting module, a charging circuit, a first switch, a power detecting circuit and a controlling module is provided. The converting module is coupled between a power inputting terminal and the battery, and connects to a load. The power inputting terminal is connected to a power. The battery is charged through the converting module or discharges to the load through the converting module. The charging circuit is coupled between the power inputting terminal and the battery for charging to the battery. The first switch is coupled between the charging circuit and the battery. The power detecting circuit is coupled to the battery for detecting a power value of the battery. The controlling module is coupled to the power detecting circuit, and control the ON/OFF state of the first switch for making the battery be charged or discharge according the power value or power supply state of the power.

20 Claims, 11 Drawing Sheets

100A

UNINTERRUPTABLE POWER SUPPLY SYSTEM

BACKGROUND OF THE INVENTION

Field of the Invention

The present invention relates to an uninterruptable power supply system, and more particularly, the present invention relates to an uninterruptable power supply system with function of energy saving and longer battery life.

Description of Related Art

At present, the system stability of electronic equipment is required higher and higher. Thus, an uninterruptable power supply system is applied in electronic equipment to ensure the power supply stability of electronic equipment.

Generally, when the external AC power supplies power nominally, the AC power is directly inputted to the load and the transformer of the uninterruptable power supply system. If determining that the power capacity of the battery drops during this period, the AC power can be converted into a DC current for charging the battery until the power capacity of the battery is full. However, once an irregularity or outage of the AC power is detected, the DC power stored in the battery can be converted into an AC power and supply the AC power to the load, so as to realize uninterruptible power.

Although the battery can be charged by the conversion through the transformer and the system can make the battery power maintain its full power capacity, but maintain of full power capacity of the battery will cause consumption of power. Moreover, the battery life is also affected if the charging times of the battery are excessive.

SUMMARY OF THE INVENTION

Accordingly, an object of the present invention is to provide an uninterruptable power supply system for meeting the requirement of energy saving and improving battery life.

To achieve the foregoing and other objects, an uninterruptable power supply system is provided. The uninterruptable power supply system includes a battery, a converting module, a charging circuit, a first switch, a power detecting circuit and a controlling module. The battery is suitable for being charged or discharging. The converting module coupled between a power inputting terminal and the battery is coupled to a load. Wherein, the power inputting terminal is coupled to a power, and the battery is charged through the converting module or discharges to the load through the converting module. The charging circuit is coupled between the power inputting terminal and the battery for charging to the battery. The first switch is coupled between the charging circuit and the battery. The power detecting circuit is coupled to the battery for detecting a power value of the battery. The controlling module is coupled to the power detecting circuit, and controls the ON/OFF state of the first switch for making the battery be charged or discharge according the power value or power supply state of the power.

In one embodiment of the present invention, the converting module includes a transformer and a full-bridge switching circuit, the transformer has at least two windings, one of the windings is coupled to the load, the full-bridge switching circuit has two half-bridge switching circuits, the serially connected node of the two half-bridge switching circuit is coupled to the other winding of the transformer, and the battery is coupled to the full-bridge switching circuit for being charged or discharging by the full-bridge switching circuit.

In one embodiment of the present invention, the transformer is a low-frequency transformer.

In one embodiment of the present invention, the controlling module includes a main controller and a charge and discharge mode controller, the main controller is coupled to the power detecting circuit, the charge and discharge mode controller is coupled to the main controller and the full-bridge switching circuit, the charge and discharge mode controller activates the full-bridge switching circuit to enter a charging or discharging mode according to the charging command or discharging command of the main controller.

In one embodiment of the present invention, the uninterruptable power supply system further includes a power switch set coupled between the power inputting terminal and one winding of the transformer, and the controlling module controls the ON/OFF state of the power switch set to determine whether the power is provided to the load.

In one embodiment of the present invention, the uninterruptable power supply system further includes a second switch, one winding of the transformer is coupled to the power inputting terminal and the load through the second switch, and the second switch is controlled to turned ON/OFF by the charge and discharge mode controller.

In one embodiment of the present invention, the converting module is a DC/AC inverter.

In one embodiment of the present invention, the charging circuit includes a rectifier and a charger, the rectifier is coupled to the power inputting terminal, and the charger is coupled between the rectifier and the first switch.

In one embodiment of the present invention, the uninterruptable power supply system further includes a system power coupled between the charger and the first switch.

In one embodiment of the present invention, the charging circuit and the converting module are coupled between the power inputting terminal and the battery in parallel.

In one embodiment of the present invention, the charging circuit and the converting module are coupled to the first switch in parallel.

In one embodiment of the present invention, the charging circuit is coupled to the battery through the first switch, and the converting module is coupled to the battery directly.

In one embodiment of the present invention, the charging circuit is a high-frequency, low-frequency or linear voltage-regulating charging circuit.

An uninterruptable power supply system is further provided in the present invention. The uninterruptable power supply system includes a battery, a converting module, a first switch, a power detecting circuit and a controlling module. The battery is suitable for being charged or discharging. The converting module is coupled between a power inputting terminal and the battery, and also is coupled to a load. In addition, the power inputting terminal is coupled to a source of power, and the battery is charged through the converting module or discharges to the load through the converting module. The first switch is coupled between the converting module and the battery. The power detecting circuit is coupled to the battery for detecting a power value of the battery. The controlling module is coupled to the power detecting circuit, and controls the ON/OFF state of the first switch for making the battery be charged or discharge according the power value or power supply state of the power.

In one embodiment of the present invention, the converting module includes a transformer and a full-bridge switching circuit, the transformer has at least two windings, one of the windings is coupled to the load, the full-bridge switching circuit has two half-bridge switching circuits, the serially connected node of the two half-bridge switching circuit is coupled to the other winding of the transformer, and the battery is coupled to the full-bridge switching circuit for being charged or discharging by the full-bridge switching circuit.

In one embodiment of the present invention, the first switch is coupled between the full-bridge switching circuit and the battery.

In one embodiment of the present invention, the controlling module includes a main controller and a charge and discharge mode controller, the main controller is coupled to the power detecting circuit, the charge and discharge mode controller is coupled to the main controller and the full-bridge switching circuit, the charge and discharge mode controller activates the full-bridge switching circuit to enter a charging or discharging mode according to the charging command or discharging command of the main controller.

In one embodiment of the present invention, the uninterruptable power supply system further includes a power switch set coupled between the power inputting terminal and one winding of the transformer, and the controlling module controls the ON/OFF state of the power switch set to determine whether the power is provided to the load.

In one embodiment of the present invention, the uninterruptable power supply system further includes a second switch, one winding of the transformer is coupled to the power inputting terminal and the load through the second switch, and the second switch is controlled to turned ON/OFF by the charge and discharge mode controller.

In one embodiment of the present invention, the converting module is a DC/AC inverter.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1A:
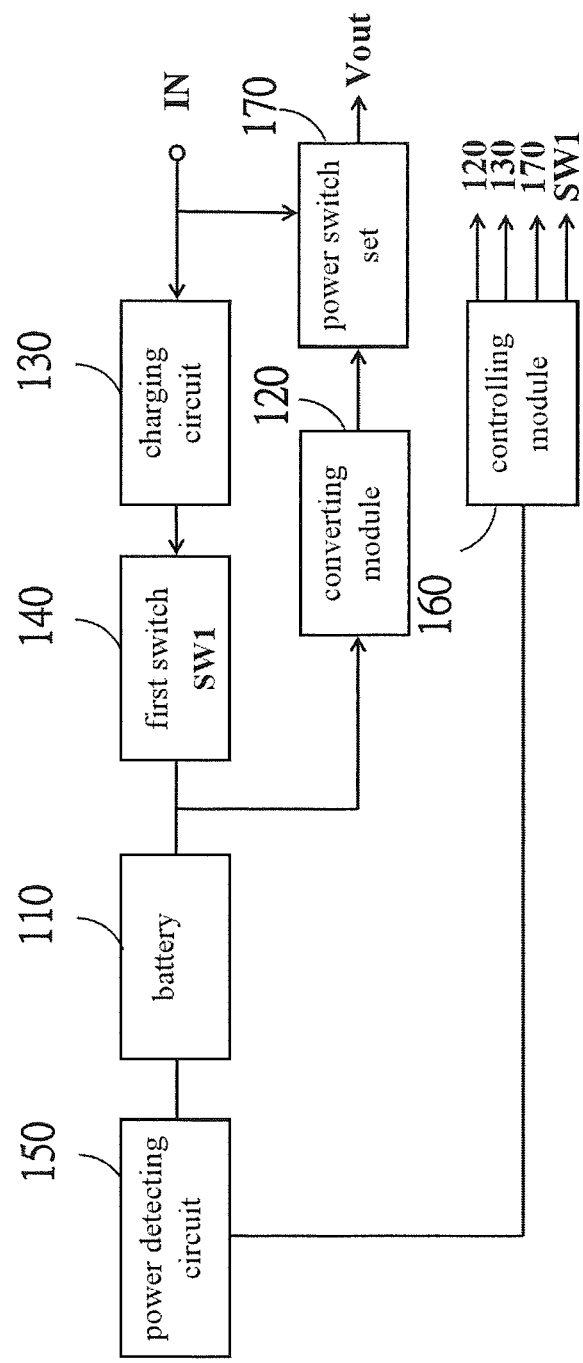
FIG. 1A is a schematic view illustrating an uninterruptable power supply system according to one embodiment of the present invention.
Figure 1B:
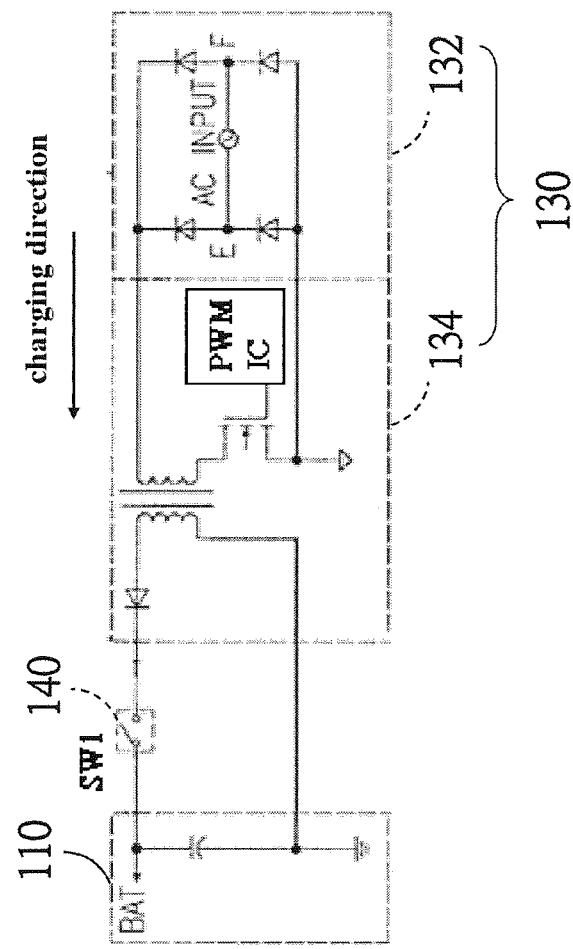
FIG. 1B is a schematic view illustrating the charging circuit of the battery in FIG. 1A.
Figure 1C:
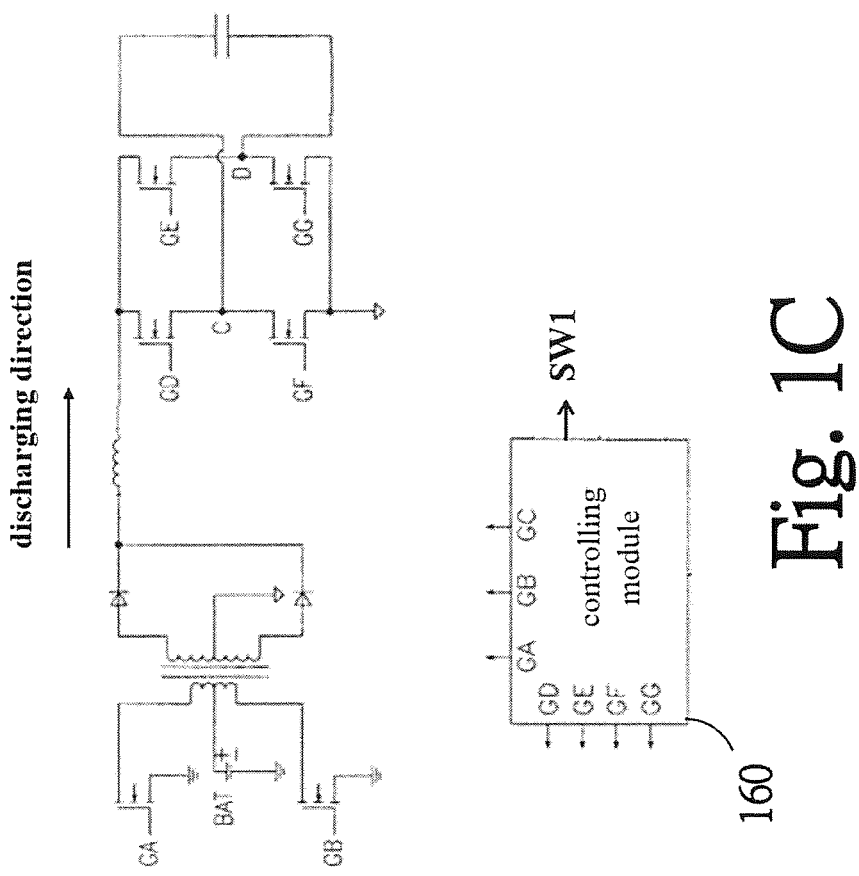
FIG. 1C is a schematic view illustrating the discharging circuit of the battery in FIG. 1A.

FIG. 1A is a schematic view illustrating an uninterruptable power supply system according to one embodiment of the present invention. FIG. 1B is a schematic view illustrating the charging circuit of the battery in FIG. 1A. FIG. 1C is a schematic view illustrating the discharging circuit of the battery in FIG. 1A. Referring to FIG. 1A, FIG. 1B and FIG. 1C, the uninterruptable power supply system 100A of the present embodiment includes a battery 110, a converting module 120, a charging circuit 130, a first switch 140, a power detecting circuit 150 and a controlling module 160 mainly. The uninterruptable power supply system of the present embodiment is, for example, Line Interactive UPS (uninterruptable power supply) system or Off Line UPS system, and the present invention will not be limited to this.

In the present embodiment, the battery 110 is suitable for being charged or discharging. Simply, the power detecting circuit 150 of the present embodiment is coupled to the battery 110 for detecting a power value of the battery 110. The controlling module 160 is coupled to the power detecting circuit 150. Therefore, the controlling module 160 can make the battery 110 be charged or discharge to the terminal of Vout through the converting module 120 according to the power value of the battery 110. The terminal of Vout is, for example, coupled to a load. In addition, the converting module 120 is coupled between the power inputting terminal IN and the battery 110. The power inputting terminal IN is, for example, a AC power inputting terminal. The AC power inputting terminal is coupled to a source of power. The source of power is, for example, a source of external AC power. In addition, the battery 110 of the present embodiment is suitable for discharging through the converting module 120. The converting module 120 is, for example, a DC/AC inverter. Besides, the charging circuit 130 of the present embodiment is coupled between the power inputting terminal IN and the battery 110. Thus, in the present embodiment, the battery 110 can be charged through the charging circuit 130.

In detail, the charging circuit 130 of the present embodiment includes a rectifier 132 and a charger. The charger is, for example, a high-frequency charger 134. The charging circuit 130 is, for example, a high-frequency charging circuit. Wherein, the rectifier 132 is coupled to the power inputting terminal IN. Thus, when the external power is, for example, the AC power and normally supplied, the charging circuit 130 is activated by the controlling module 160 if the power value of the battery 110 is not full which detecting by the power detecting circuit 150. The DC current outputted from the rectifier 132 is converted into a DC power with a specific voltage, and is supplied to charge the battery 110, and maintain the full power capacity of the battery 110. Correspondingly, when an irregularity or outage of the external power is detected, the controlling module 160 will send a discharging command to make the DC power stored in the battery 110 convert to the AC power through the converting module 120 for supplying to the external loading device, so as to realize uninterruptible power. In other preferred embodiment, the charging circuit also can be a low-frequency or a linear voltage-regulating charging circuit, and the present invention will not be limited to this.

Worth mention, in the present embodiment, the charging circuit 130 and the converting module 120 are coupled between the power inputting terminal IN and the battery 110 in parallel. Further, the charging circuit 130 is coupled to the battery 110 through the first switch 140, and the converting module 120 is coupled to the battery 110 directly. In other words, the first switch 140 is coupled between the charging circuit 130 and the battery 110. Further, the high-frequency charger 134 is coupled between the rectifier 132 and the first switch 140. Therefore, the controlling module 160 can control the ON/OFF state of the first switch 140 according to the power value of the battery 110. Further, the battery 110 can be charged.

Figure 1D:
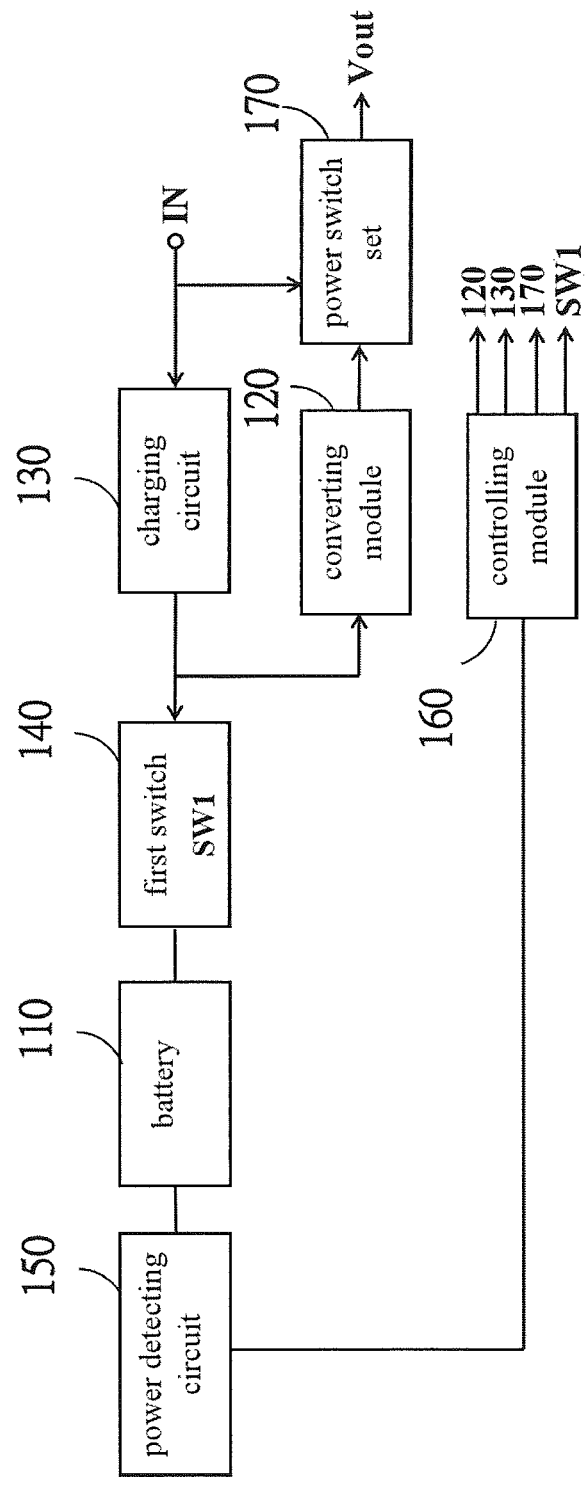
FIG. 1D is a schematic view illustrating an uninterruptable power supply system according to one embodiment of the present invention.

FIG. 1D is a schematic view illustrating an uninterruptable power supply system according to one embodiment of the present invention. Referring to FIG. 1D, the uninterruptable power supply system of the present embodiment 100B is similar to the uninterruptible power supply system 100A of the foregoing embodiment. Further, in the uninterruptible power supply system 100B of the present embodiment, the charging circuit 130 and the converting module 120 are, for example, couple to the first switch 140 in parallel. Therefore, when an irregularity or outage of the external power is detected, the controlling module 160 will send the discharging command to turn on the power supply state of the power. Further, the DC power stored in the battery 110 can be converted to AC power through the converting module 120 for supplying to the external loading device, so as to realize uninterruptable power. In other words, the controlling module 160 can control the ON/OFF state of the first switch 140 according to the power supply state of the external power. Further, the battery 110 can be charged or discharge.

Figure 2A:
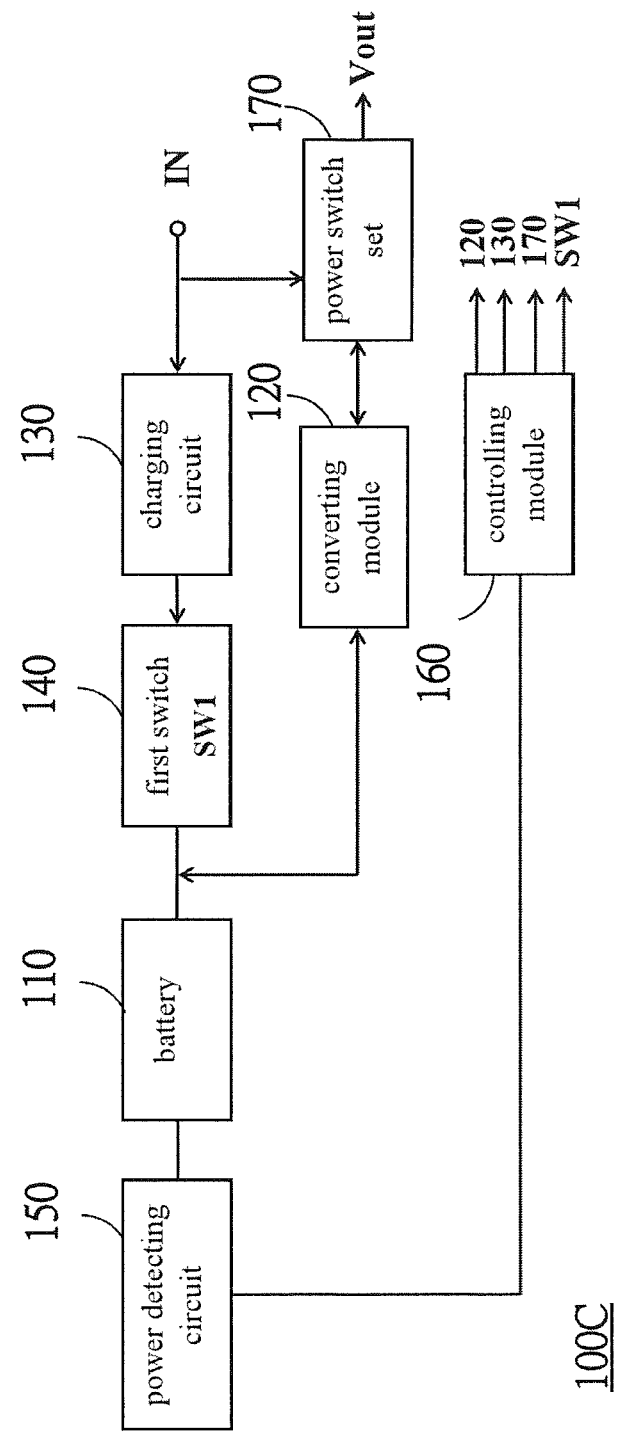
FIG. 2A is a schematic view illustrating an uninterruptable power supply system according to one embodiment of the present invention.
Figure 2B:
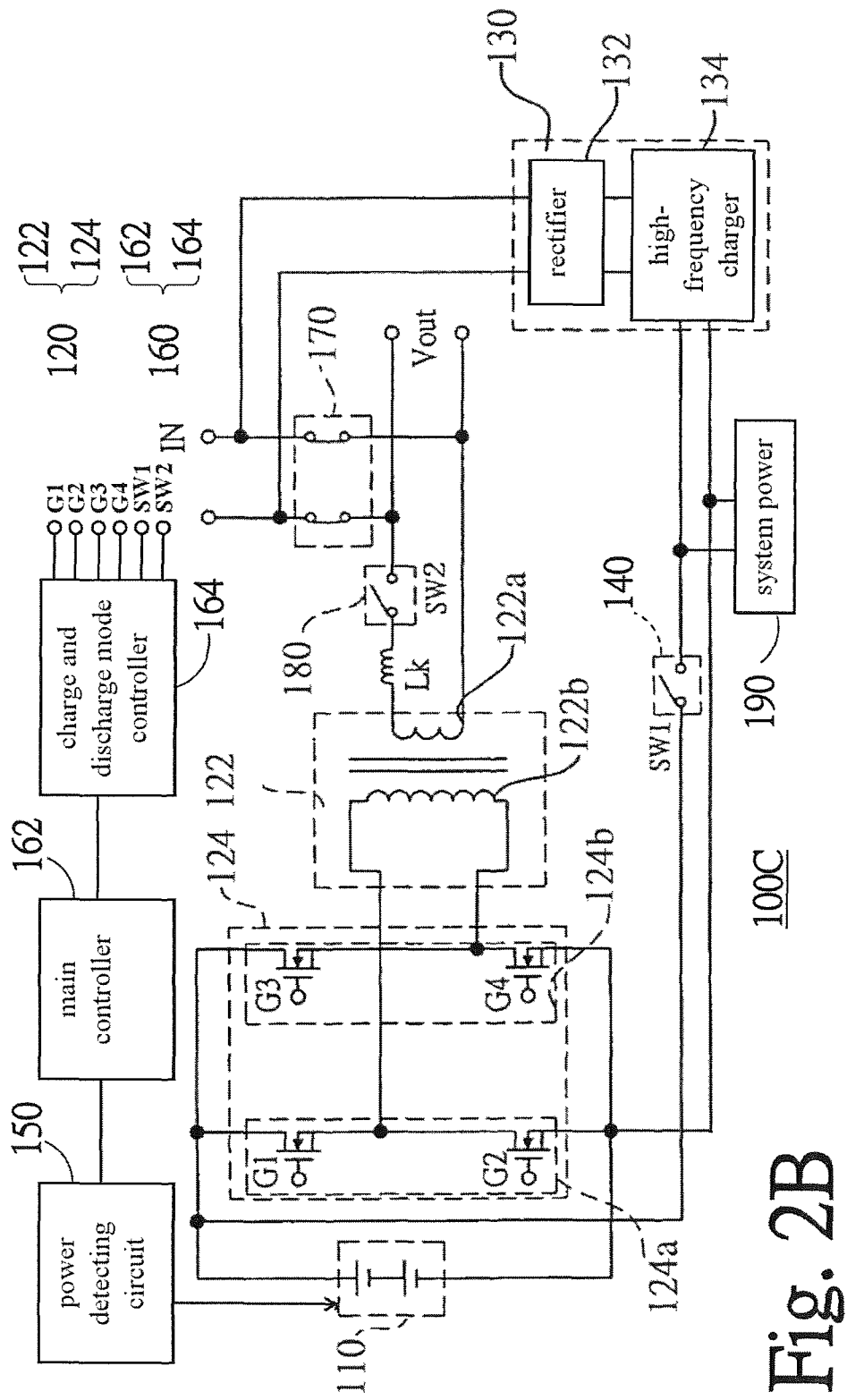
FIG. 2B is a schematic view illustrating one embodiment of FIG. 2A.

FIG. 2A is a schematic view illustrating an uninterruptable power supply system according to one embodiment of the present invention. FIG. 2B is a schematic view illustrating one embodiment of FIG. 2A. Referring to FIG. 2A and FIG. 2B, the uninterruptable power supply system of the present embodiment 100C is similar to the uninterruptable power supply system 100A of the foregoing embodiment. Further, in the present embodiment, the first switch 140 is coupled between the charging circuit 130 and the battery 110 similarly. Thus, when the external power is, for example, the AC power and normally supplied, the charging circuit 130 is also activated by the controlling module 160 to charge the battery 110 for maintaining the full power capacity if the power value of the battery 110 is not full which detecting by the power detecting circuit 150.

Further, in the uninterruptable power supply system 100C of the present embodiment, the converting module 120 is coupled between the power inputting terminal IN and the battery 110 similarly, and is suitable for coupling to a load. The converting module 120 includes a transformer 122 and a full-bridge switching circuit 124. The transformer 122 is, for example, a low-frequency transformer. Wherein, the transformer 122 has two windings 122a, 122b. One of the winding 122a is coupled to the load through an outputted terminal Vout. On the other hand, the full-bridge switching circuit 124 has two half-bridge switching circuits 124a, 124b. The serially connected node of the two half-bridge switching circuits 124a, 124b is coupled to the other winding 122b of the transformer 122, and the battery 110 is coupled to the full-bridge switching circuit 124. Therefore, the uninterruptable power supply system 100C of the present embodiment can perform charging or discharging through the full-bridge switching circuit 124.

In addition, the controlling module 160 of the present embodiment can include a main controller 162 and a charge and discharge mode controller 164. The main controller 162 is coupled to the power detecting circuit 150. The charge and discharge mode controller 164 is coupled to the main controller 162 and the full-bridge switching circuit 124. Wherein, the charge and discharge mode controller 164 activates the full-bridge switching circuit 124 to enter a charging or discharging mode according to the charging command or the discharging command of the main controller 162. Besides, in the present embodiment, the uninterruptable power supply system 100C further includes a second switch 180. Wherein, one winding of the transformer 122 is coupled to the power inputting terminal IN and the load through the second switch 180. In addition, the charge and discharge mode controller 164 can control the first switch 140 and the second switch 180 turn on or turn off.

Worth mention, when the main controller 162 outputs a signal indicating that the current power capacity of the battery 110 is full to the charge and discharge mode controller 164, the charge and discharge mode controller 164 turns off the second switch 180 to make the transformer 122 disconnect with the external power and the load. The first switch 140 and the second switch 180 are, for example, relays. Relatively, the power of the battery 110 is converted into an AC power for supplying to the load in case of the external power outage, and then the battery 110 drops to a low power capacity, the controlling module 160 will send the charging command to the converting module 120 for performing a high current charging mode after the resumption of electricity of the external power. Therefore, the charge and discharge mode controller 164 will keep the second switch 180 turn on for making the transformer 122 connect with the external power and the load. Further, the battery 110 is charged by the external power with the high current of the DC power quickly through the transformer 122 and the full-bridge switching circuit 124 until the power capacity of the battery 110 is full.

Especially, when the power capacity of the battery 110 is full and then is in uncharged mode, the power capacity of the battery 110 will drops naturally and slightly after a period of time. Thus, when the main controller 162 determine that the power capacity of the battery 110 drops slightly, it is only necessary for charging the battery 110 with small power capacity. Therefore, the main controller 162 will send a command of small current charge mode to the charge and discharge mode controller 164. Further, the charge and discharge mode controller 164 will make the second switch 180 turn off to keep the transformer 122 disconnecting with the external power and the load. Simultaneously, the charging circuit 130 such as the high-frequency charging circuit will be activated to convert the external power into the DC current for charging the battery 110 directly. Therefore, in the uninterruptable power supply system 100C of the present embodiment, the battery 110 can be charged without passing the transformer 122 and the full-bridge switching circuit 124, thereby effectively reducing overall power consumption.

Certainly, when the power capacity of the battery 110 drops and detected by the main controller 162, the present embodiment can determine to make the charge and discharge mode controller 164 activate the full-bridge switching circuit 124 for performing high current charging (it means that the second switch 180 is turned on) according to the current power capacity of the battery 110. Further, the present embodiment also can perform power supply with small power capacity through only the charging circuit 130 (it means that the first switch 140 is turned on). In one preferred embodiment, the second switch 180 can be turned on firstly by the charge and discharge mode controller 164 for activating the full-bridge switching circuit 124 to charge with high current. When the battery 110 approach its full power capacity, then the first switch 140 can be turned on for charging with small power capacity by the charging circuit 130. In fact, after the battery 110 discharges in battery mode, the charge with high current can be performed by applying the converting module 120. In general, when the power capacity of the battery 110 drops and is detected, the charging circuit 130 can be applied to charge with small current.

Further, since the normal power supply time of external power such as AC power is longer, the present invention adds the high-frequency charging circuit to avoid the power loss caused by adopting the low-frequency transformer with lower conversion efficiency to charge the battery 110 repeatedly. Furthermore, when the external power is detected in normally supplied state, the second switch 180 is turned off to make the transformer no longer connect with the external power directly for preventing extra power consumption. More specifically, in the present embodiment, a first switch 140 can further be configured between the charging circuit 130 and the battery 110. Thus, when the main controller 162 determines that power capacity of the battery 110 is full, the first switch 140 can be turned off for disconnecting the charging circuit 130 and the battery 110. This can achieve the efficacy of energy saving more and longer life of the battery 110. In other words, the uninterruptable power supply system of the present embodiment has function of energy saving and longer battery life.

In one preferred embodiment, the uninterruptable power supply system 100C further includes a power switch set 170. The power switch set 170 is coupled between the power inputting terminal IN and one winding 122a of the transformer 122. Thus, the controlling module 160 can control the ON/OFF state of the power switch set 170 to determine whether one external power is provided to the load. In addition, the converting module 120 is, for example, a DC/AC inverter. Besides, in the present embodiment, the uninterruptable power supply system 100 further includes a system power 190. The system power 190 is coupled between the high-frequency charger 134 and the first switch 140.

Figure 2C:
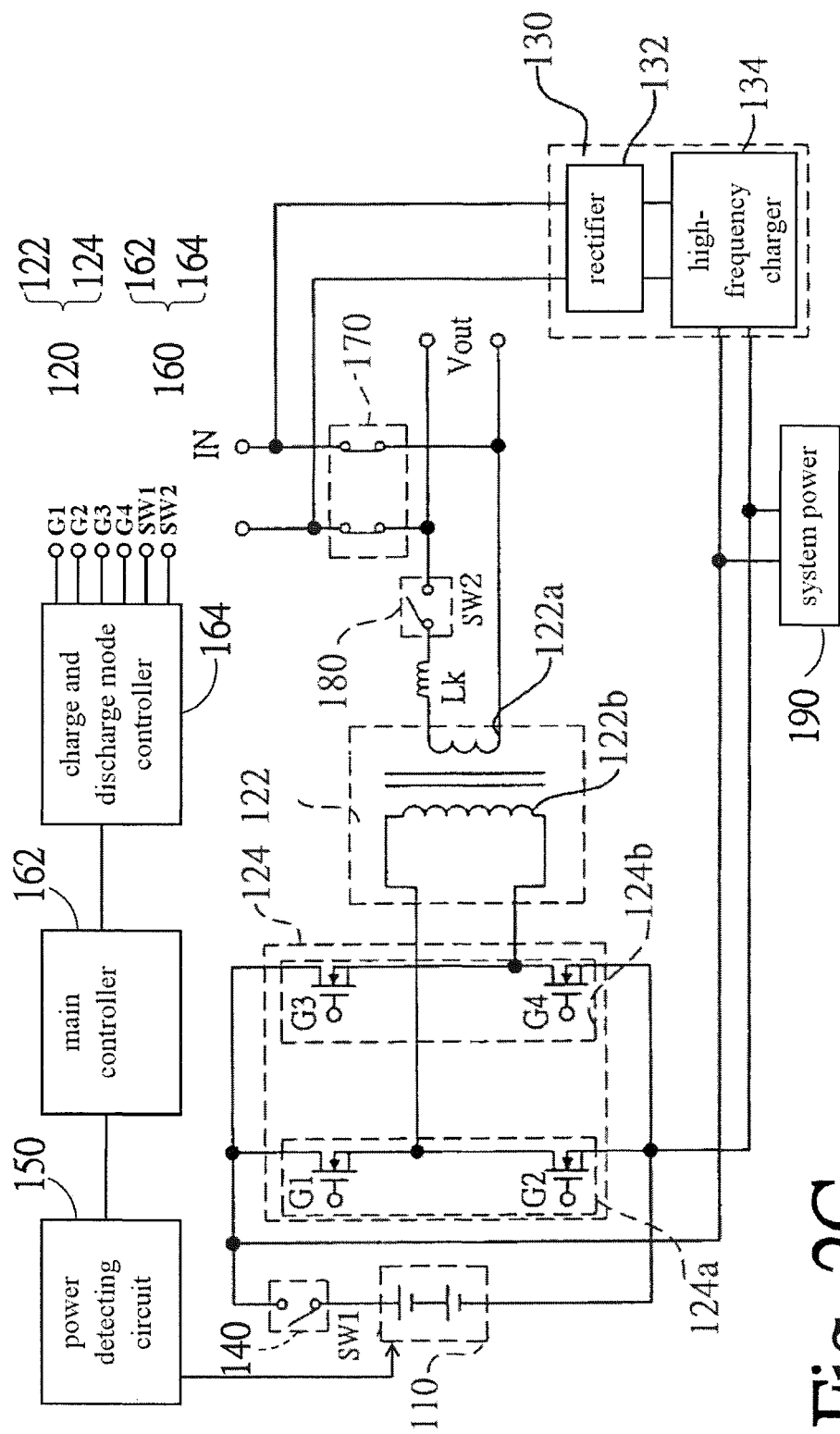
FIG. 2C is a schematic view illustrating one embodiment of FIG. 2A.
Figure 2D:
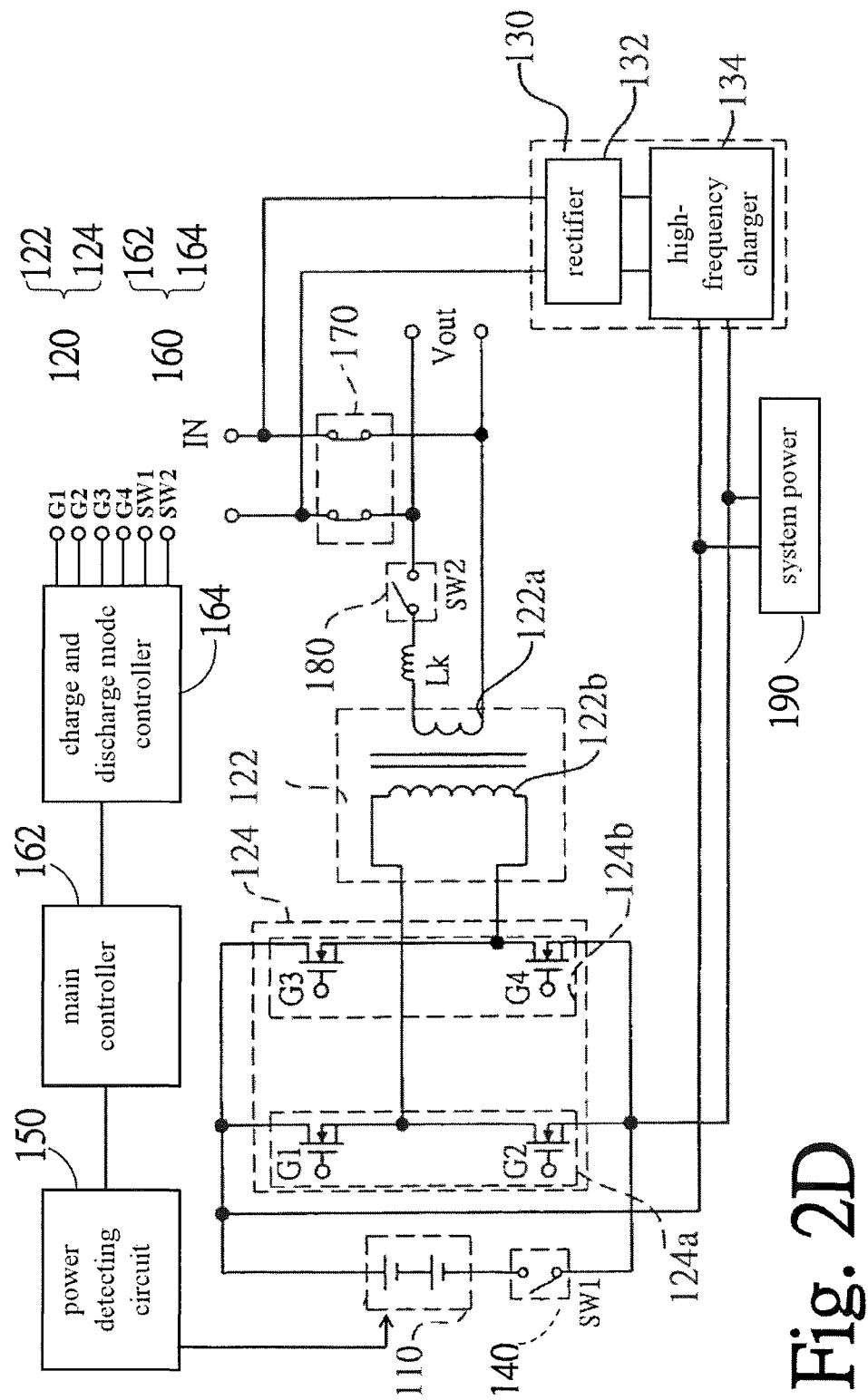
FIG. 2D is a schematic view illustrating one embodiment of FIG. 2A.

FIG. 2C is a schematic view illustrating one embodiment of FIG. 2A. FIG. 2D is a schematic view illustrating one embodiment of FIG. 2A. Referring to FIG. 2C and FIG. 2D, the embodiment illustrated in FIG. 2C and FIG. 2D is similar to the embodiment illustrated in FIG. 2B, the difference of this two embodiments is just in the configuring position of the first switch 140, the description of which is omitted herein.

Figure 3A:
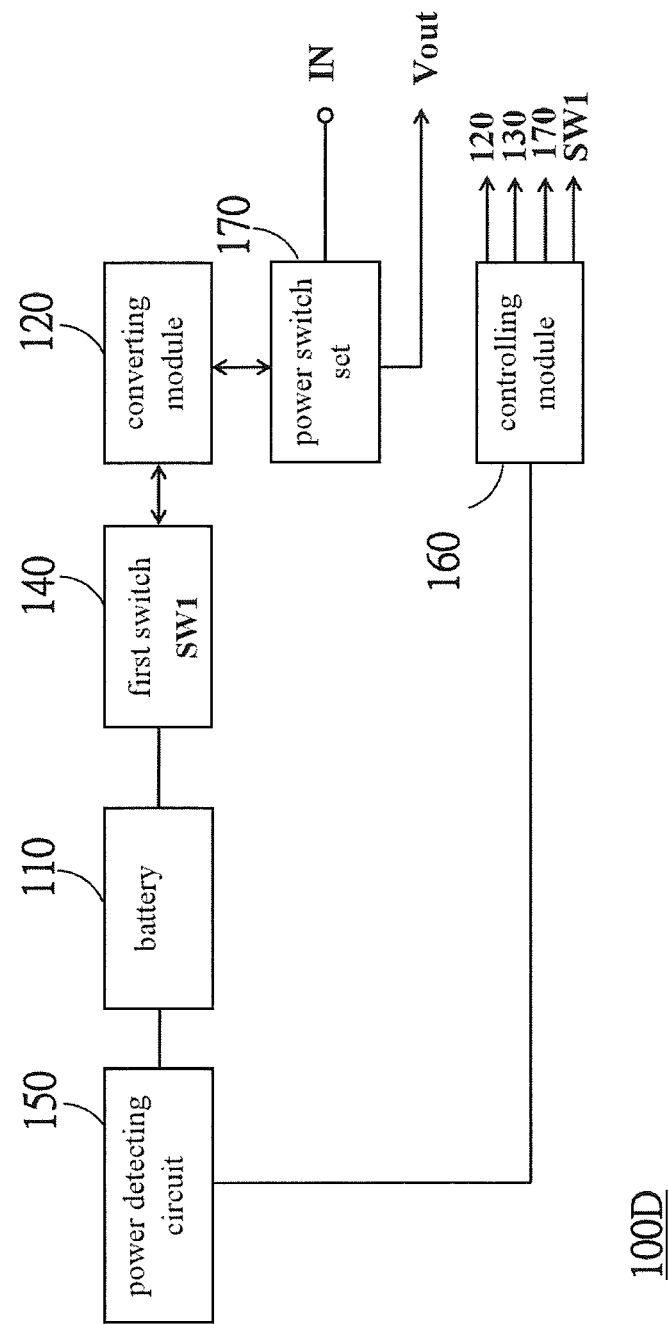
FIG. 3A is a schematic view illustrating an uninterruptable power supply system according to one embodiment of the present invention.
Figure 3B:
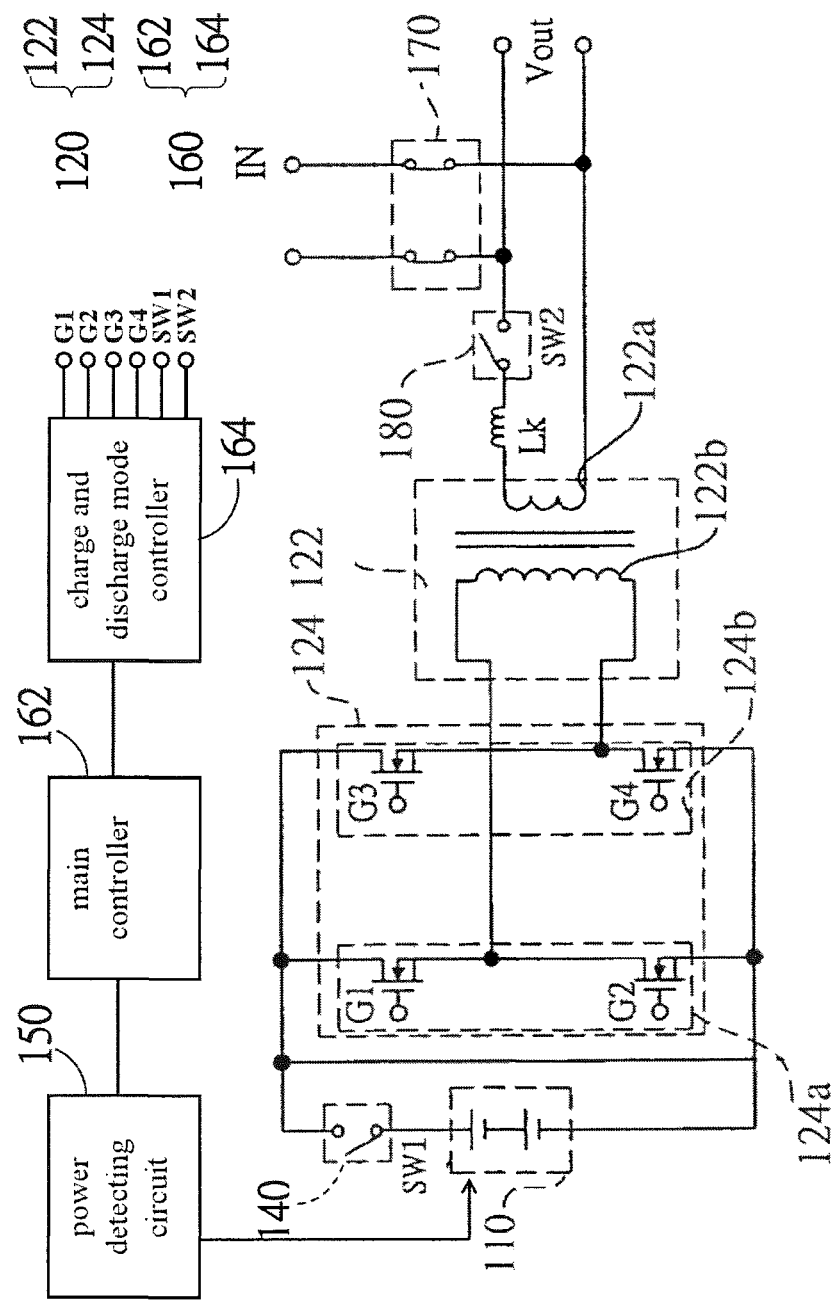
FIG. 3B is a schematic view illustrating one embodiment of FIG. 3A.

FIG. 3A is a schematic view illustrating an uninterruptable power supply system according to one embodiment of the present invention. FIG. 3B is a schematic view illustrating one embodiment of FIG. 3A. Referring to FIG. 3A and FIG. 3B, the uninterruptable power supply system 100D of the present embodiment is similar to the uninterruptable power supply system 100C of the foregoing embodiment, the difference of this two embodiments is: in the uninterruptable power supply system of the present embodiment 100D, only the converting module 120 is applied to charge and discharge for the battery 110 and the first switch 140 of the present embodiment is coupled between the full-bridge switching circuit 124 and the battery 110. In other words, the battery 110 is suitable for being charged through the converting module 120 or discharging to the load through the converting module 120. The converting module 120 is, for example, a DC/AC inverter.

In addition, the controlling module 160 also can control the ON/OFF state of the first switch 140 and the second switch 180 for making the battery 110 be charged or discharge according to the power value of the battery 110 or the power supply state of power. Simultaneously, the present embodiment can achieve the efficacy of energy saving more and longer life of the battery, the description of which is omitted herein.

Figure 3C:
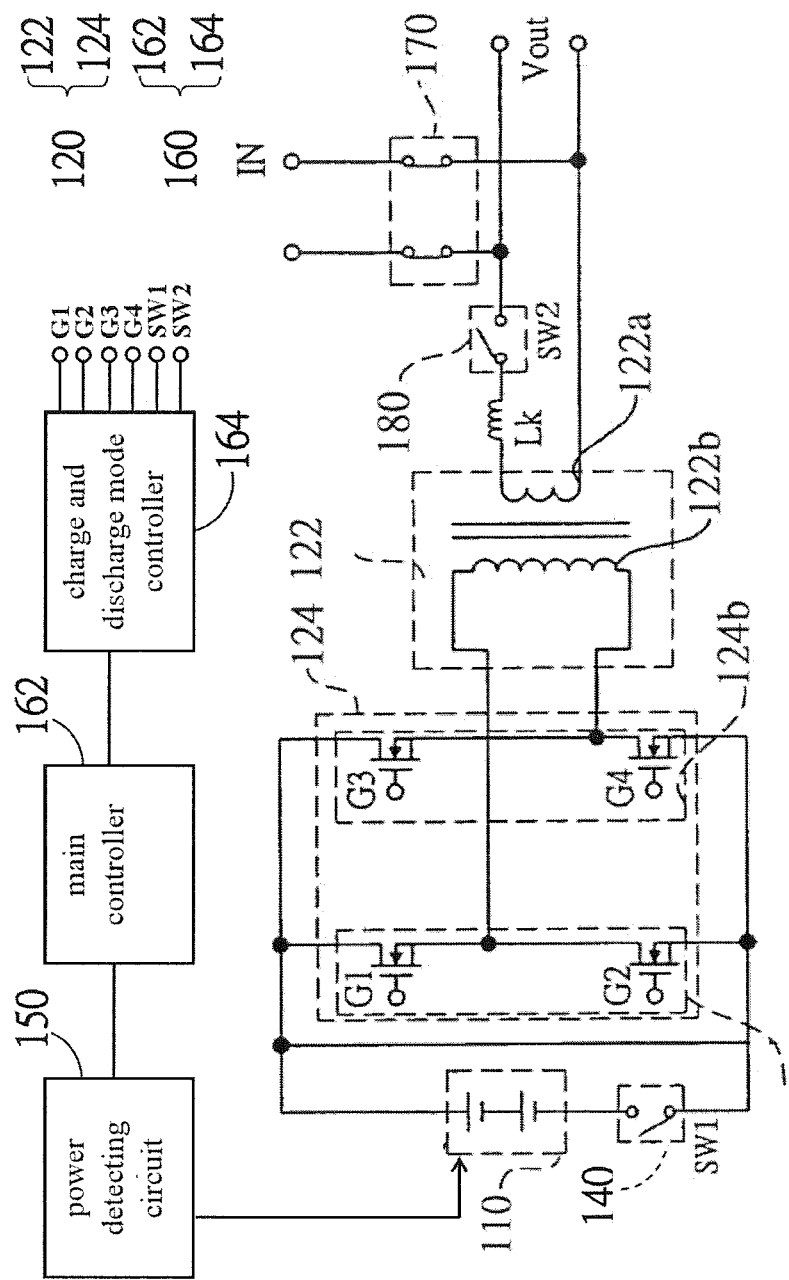
FIG. 3C is a schematic view illustrating one embodiment of FIG. 3A.

Besides, FIG. 3C is a schematic view illustrating one embodiment of FIG. 3A. Referring to FIG. 3C, the embodiment illustrated in FIG. 3C is similar to the embodiment illustrated in FIG. 3B, the difference of this two embodiments is just in configuring position of the first switch 140, the description of which is omitted herein.

To sum up, in the present invention, a switch can be configured between the battery and the charging circuit or configured between the battery and the converting module, and controls the ON/OFF stat of the switch according to the power value of the battery or the power supply state of external power for making the battery be charged or discharge, and achieve the efficacy of energy saving more and longer life of the battery simultaneously.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An uninterruptable power supply system, comprising:
    a battery for being charged or discharging;
    a converting module, coupled between a power inputting terminal and the battery, wherein the converting module is coupled to a load, the power inputting terminal is coupled to a source of power, and the battery is charged through the converting module or discharges to the load through the converting module;
    a charging circuit, coupled between the power inputting terminal and the battery for charging to the battery;
    a first switch, coupled between the charging circuit and the battery;
    a power detecting circuit, coupled to the battery for detecting a power value of the battery; and
    a controlling module, coupled to the power detecting circuit, and controls the ON/OFF state of the first switch for making the battery be charged or discharge according the power value or power supply state of the power.

2. The uninterruptable power supply system of claim 1, wherein the converting module includes a transformer and a full-bridge switching circuit, the transformer has at least two windings, one of the windings is coupled to the load, the full-bridge switching circuit has two half-bridge switching circuits, the serially connected node of the two half-bridge switching circuit is coupled to the other winding of the transformer, and the battery is coupled to the full-bridge switching circuit for being charged or discharging by the full-bridge switching circuit.

3. The uninterruptable power supply system of claim 2, wherein the transformer is a low-frequency transformer.

4. The uninterruptable power supply system of claim 2, wherein the controlling module includes a main controller and a charge and discharge mode controller, the main controller is coupled to the power detecting circuit, the charge and discharge mode controller is coupled to the main controller and the full-bridge switching circuit, the charge and discharge mode controller activates the full-bridge switching circuit to enter a charging or discharging mode according to the charging command or discharging command of the main controller.

5. The uninterruptable power supply system of claim 4, further comprising a power switch set coupled between the power inputting terminal and one winding of the transformer, and the controlling module controls the ON/OFF state of the power switch set to determine whether the power is provided to the load.

6. The uninterruptable power supply system of claim 4, further comprising a second switch, one winding of the transformer is coupled to the power inputting terminal and the load through the second switch, and the second switch is controlled to turned ON/OFF by the charge and discharge mode controller.

7. The uninterruptable power supply system of claim 1, wherein the converting module is a DC/AC inverter.

8. The uninterruptable power supply system of claim 1, wherein the charging circuit includes a rectifier and a charger, the rectifier is coupled to the power inputting terminal, and the charger is coupled between the rectifier and the first switch.

9. The uninterruptable power supply system of claim 8, further comprising a system power coupled between the charger and the first switch.

10. The uninterruptable power supply system of claim 1, wherein the charging circuit and the converting module are coupled between the power inputting terminal and the battery in parallel.

11. The uninterruptable power supply system of claim 10, wherein the charging circuit and the converting module are coupled to the first switch in parallel.

12. The uninterruptable power supply system of claim 1, wherein the charging circuit is coupled to the battery through the first switch, and the converting module is coupled to the battery directly.

13. The uninterruptable power supply system of claim 1, wherein the charging circuit is a high-frequency, a low-frequency or a linear voltage-regulating charging circuit.

14. An uninterruptable power supply system, comprising:
a battery for being charged or discharging;
a converting module, coupled between a power inputting terminal and the battery, wherein the converting module is coupled to a load, the power inputting terminal is coupled to a source of power, and the battery is charged through the converting module or discharges to the load through the converting module;
a first switch, coupled between the converting module and the battery;
a power detecting circuit, coupled to the battery for detecting a power value of the battery; and
a controlling module, coupled to the power detecting circuit, and controls the ON/OFF state of the first switch for making the battery be charged or discharge according the power value or power supply state of the power.

15. The uninterruptable power supply system of claim 14, wherein the converting module includes a transformer and a full-bridge switching circuit, the transformer has at least two windings, one of the windings is coupled to the load, the full-bridge switching circuit has two half-bridge switching circuits, the serially connected node of the two half-bridge switching circuit is coupled to the other winding of the transformer, and the battery is coupled to the full-bridge switching circuit for being charged or discharging by the full-bridge switching circuit.

16. The uninterruptable power supply system of claim 15, wherein the first switch is coupled between the full-bridge switching circuit and the battery.

17. The uninterruptable power supply system of claim 15, wherein the controlling module includes a main controller and a charge and discharge mode controller, the main controller is coupled to the power detecting circuit, the charge and discharge mode controller is coupled to the main controller and the full-bridge switching circuit, the charge and discharge mode controller activates the full-bridge switching circuit to enter a charging or discharging mode according to the charging command or discharging command of the main controller.

18. The uninterruptable power supply system of claim 17, further comprising a power switch set coupled between the power inputting terminal and one winding of the transformer, and the controlling module controls the ON/OFF state of the power switch set to determine whether the power is provided to the load.

19. The uninterruptable power supply system of claim 17, further comprising a second switch, one winding of the transformer is coupled to the power inputting terminal and the load through the second switch, and the second switch is controlled to turned ON/OFF by the charge and discharge mode controller.

20. The uninterruptable power supply system of claim 14, wherein the converting module is a DC/AC inverter.

* * * * *